United States Patent [19]

Bush et al.

[11] Patent Number: 4,613,953
[45] Date of Patent: Sep. 23, 1986

[54] PAGING REGISTER FOR MEMORY DEVICES

[75] Inventors: John M. Bush; David L. Ruhberg, both of Fort Collins, Colo.

[73] Assignee: NCR Corporation, Dayton, Ohio

[21] Appl. No.: 487,554

[22] Filed: Apr. 22, 1983

[51] Int. Cl.[4] ............................................. G06F 12/06
[52] U.S. Cl. .................................................... 364/900
[58] Field of Search ... 364/200 MS File, 900 MS File

[56] References Cited

U.S. PATENT DOCUMENTS

| | | | |
|---|---|---|---|
| 3,821,715 | 6/1974 | Hoff et al. | 340/172.5 |
| 4,037,211 | 7/1977 | Ikuta | 364/200 |
| 4,340,932 | 7/1982 | Bakula | 364/200 |
| 4,346,441 | 8/1982 | Plank | 364/200 |
| 4,374,417 | 2/1983 | Bradley | 364/200 |
| 4,383,296 | 5/1983 | Sander | 364/200 |
| 4,403,283 | 9/1983 | Myntti | 364/200 |

Primary Examiner—James D. Thomas
Assistant Examiner—Florin Munteanu
Attorney, Agent, or Firm—J. T. Cavender; Casimer K. Salys

[57] ABSTRACT

An addressing and control system for a mass memory which is partitioned into selectable pages of individually specified size. The invention generates a composite address for the mass memory so that a microcomputer of limited address size can access the mass memory by individually specified page. One circuit implementation utilizes a register to latch page size and selection information for subsequent combination with address information to generate a full address for the mass memory. In that situation, the size register multiplexes the address bus information and page selection information to maintain correspondence between the specified size of the page and the total addressing bits available. In another form, the invention provides for supplementing the number of address bus bits with bits transmitted over the data bus to extend the bit length of the address used to access the mass memory.

5 Claims, 5 Drawing Figures

PAGING REGISTER FOR MEMORY DEVICES

BRIEF SUMMARY

The present invention relates to a microcomputer addressing and control system for operatively addressing a mass memory so that the memory can be partitioned into selectable pages of individually specified size. The invention is directed toward an application in which the addressable content of the whole mass memory exceeds the addressing size available to the microcomputer, whereas the information within the mass memory actually resides in blocks whose individual address size is compatible with the address size available to the microcomputer.

In one form, the invention contemplates a high speed, semiconductor, chip type mass memory, such as a large read only memory (ROM) chip, having a data content significantly exceeding the available address size of the microcomputer system connected thereto. The corresponding circuit implementation of the mass memory addressing and control system utilizes a memory control register to receive and hold page size and page select information off a multiplexed data bus. A decode circuit connected to the address bus initiates a latch of the page size and select information into the memory control register when a specified bit code appears on the address bus coincident with a defined chip select line signal. The page address information in the page selection register of the memory control register, as well as various address bus lines, are connected to the mass memory via a memory control multiplexer. The size address information is coupled to the memory control multiplexer to prescribe and limit the page address bit code coupled to the mass memory within the page size limits established.

These and other features of the present invention will be more clearly understood upon considering the particular embodiment described hereinafter.

DETAILED DESCRIPTION

With the advent of low-cost microcircuit memory arrays having the capability of storing exceptionally large volumes of directly accessible data, the utilization of relatively slow tape or disk type mass memory systems are undergoing critical comparative evaluation. This is particularly true for small-to-medium microcomputer systems, where the cost of such peripheral equipment becomes a significant portion of the system price, the mechanical constituents commonly exhibit a lower reliability and slower access time, and the peripheral equipment often far exceeds the nominal memory needs of the microcomputer user.

However, after the allocation of addresses for data, internal control, and a keyboard peripheral, a typical microcomputer system may have sufficient address remaining for a single operating program, such as either BASIC or PASCAL, but not for both these and other programs of potential interest to the microcomputer user. It is obviously possible to resort to mechanically implemented mass storage configurations to retain the diverse programs sought, and to transfer the selected program into internal RAM during each microcomputer program operation. However, the utilization of peripheral systems inherently introduces the deficiencies noted earlier.

The present invention obviates the need for mechanically implemented peripheral mass storage apparatus by employing a relatively large, yet inexpensive, memory array of preferably nonvolatile design to retain a plurality of programs in a multiplicity of distinctly addressable pages. The particular embodiment of an address and control system illustrated hereinafter latches information conveyed on the data bus into a memory control register, and subsequently utilizes that information to establish page size and selection for addressing the appropriate block from within the memory array. The page size and selection information latched into the memory control register is combined with each set of memory addresses generated by the microcomputer to form a composite address bit length directly compatible with the mass memory array.

Figure 1:
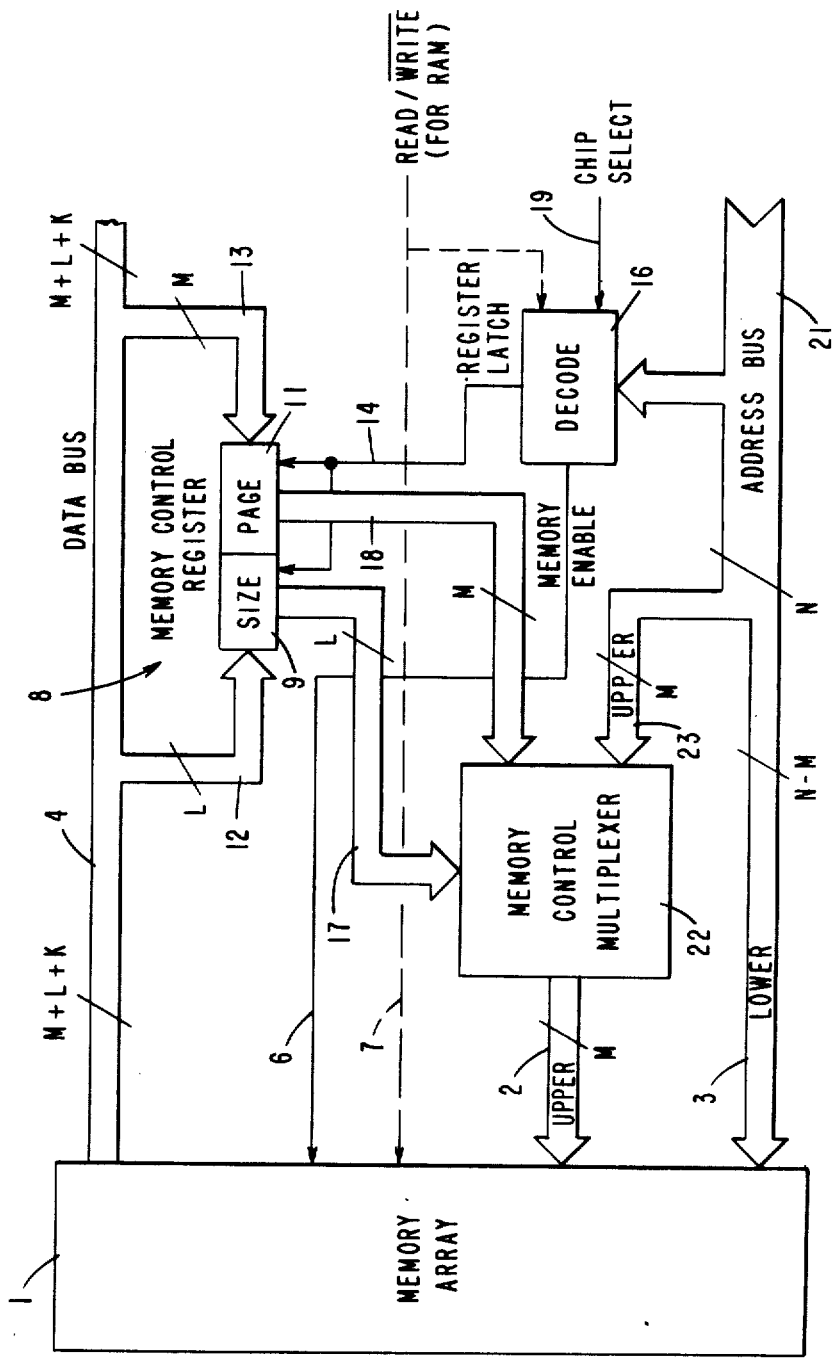
FIG. 1 is a block diagram schematically depicting one embodiment of the mass memory addressing and control system.

To understand and appreciate the novel features of the present addressing and control system, consider the embodiment illustrated by way of the block diagram in FIG. 1 of the drawings. As depicted therein, memory array 1 is preferably a relatively large ROM, though it could with equal effect be a RAM or other electronically implemented mass storage medium. The addressing of data from within memory array 1 is performed via the composite of upper address bus 2 and lower address bus 3, together forming a single set of N input address lines to array 1. The output data from memory array 1 are coupled onto data bus 4. To provide data bus 4 with a multiplexed mode of operation, and allow the whole of memory array 1 to be selectively disabled, the output buffers from memory array 1 are prescribed to have a tristate operating mode. For the particular illustration in FIG. 1, the read/write line, 7, for the RAM configuration of memory array 1 is also depicted.

The addressing and control system in FIG. 1 also includes a memory control register, 8, comprised of page size register 9 and page select register 11. Registers 9 and 11 are connected to data bus 4 using respective buses 12 and 13. The data appearing on bus lines 12 and 13 is latched into respective registers 9 and 11 by a latch command signal, on register latch line 14, generated in decode block 16. It should be recognized that the bit code latched into the size and page registers remains operative until the succeeding register latch signal. Consequently, the data code on size bus 17 and page bus 18 from respective registers 9 and 11 can remain for an unlimited sequence of addressing operations performed over address bus 21.

The signal on register latch line 14 is generated within decode block 16 on the basis of the chip select state on line 19 and the bit code on address bus 21. Namely, when the appropriate bit code appears on address bus 21 in time coincidence with the appropriate condition on chip select line 19, data bus information is latched into memory control register 8. During this latch period, memory array 1 is disabled by an appropriate signal on memory enable line 6.

The read/write line, 7, entering decode 16 and memory array 1 depicts the arrangement used with a RAM type array. It should be appreciated that the connection of the read/write lines to decode 16, and operationally to memory control register 8, is added for a circuit configuration in which the states of the registers in memory control register 8 are to be interrogated over data bus 4. This variant will be developed in greater detail at a later point.

The remaining element to be considered in the block diagram of FIG. 1 is memory control multiplexer 22. As embodied, memory control multiplexer 22 multiplexes the bit content of upper address bus 23 and page bus 18 on the basis of the bit code on size bus 17. The output from memory control multiplexer 22 appears on upper address bus 2, which when combined with lower address bus 3 generates the composite address for selecting data from within memory array 1.

It should be understood that the contribution of upper address bus 23 may be wholly or partially deleted, such as would occur in an application where the number of address lines required to select data from memory array 1 was greater than the size of address bus 21. In that situation, the data bus 4 would be utilized to provide the supplemental bits necessary to complement the address on line 3 so that the bit length would be compatible with the size of memory array 1. Consequently, it should be understood that the sizes of the various buses in FIG. 1 are merely illustrative of a convenient and readily comprehensible configuration.

Figure 2:
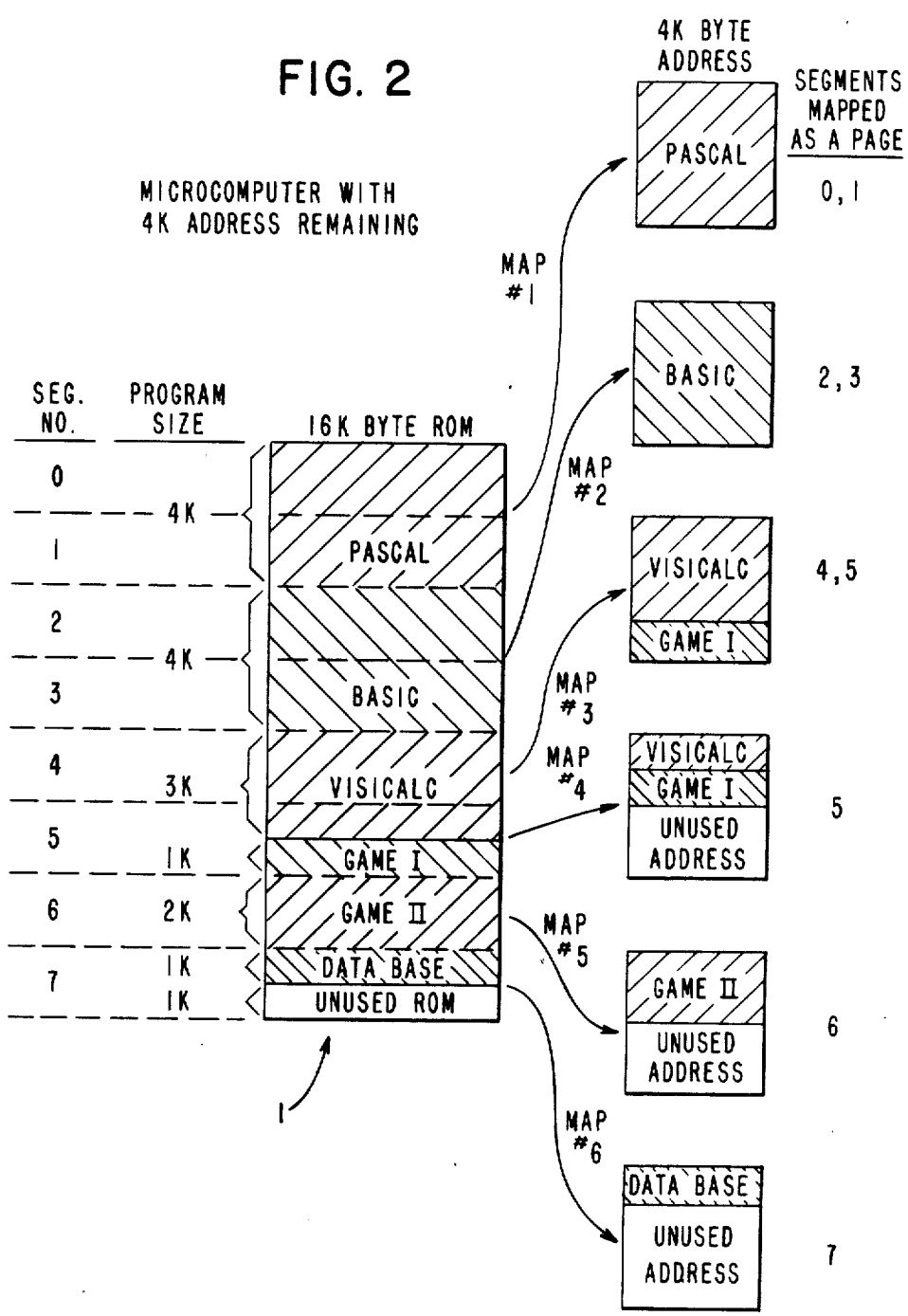
FIG. 2 is a schematic diagram of six different address maps suitable to interface a 16K byte ROM or RAM mass memory with a microcomputer having 4K available address.
Figure 3A:
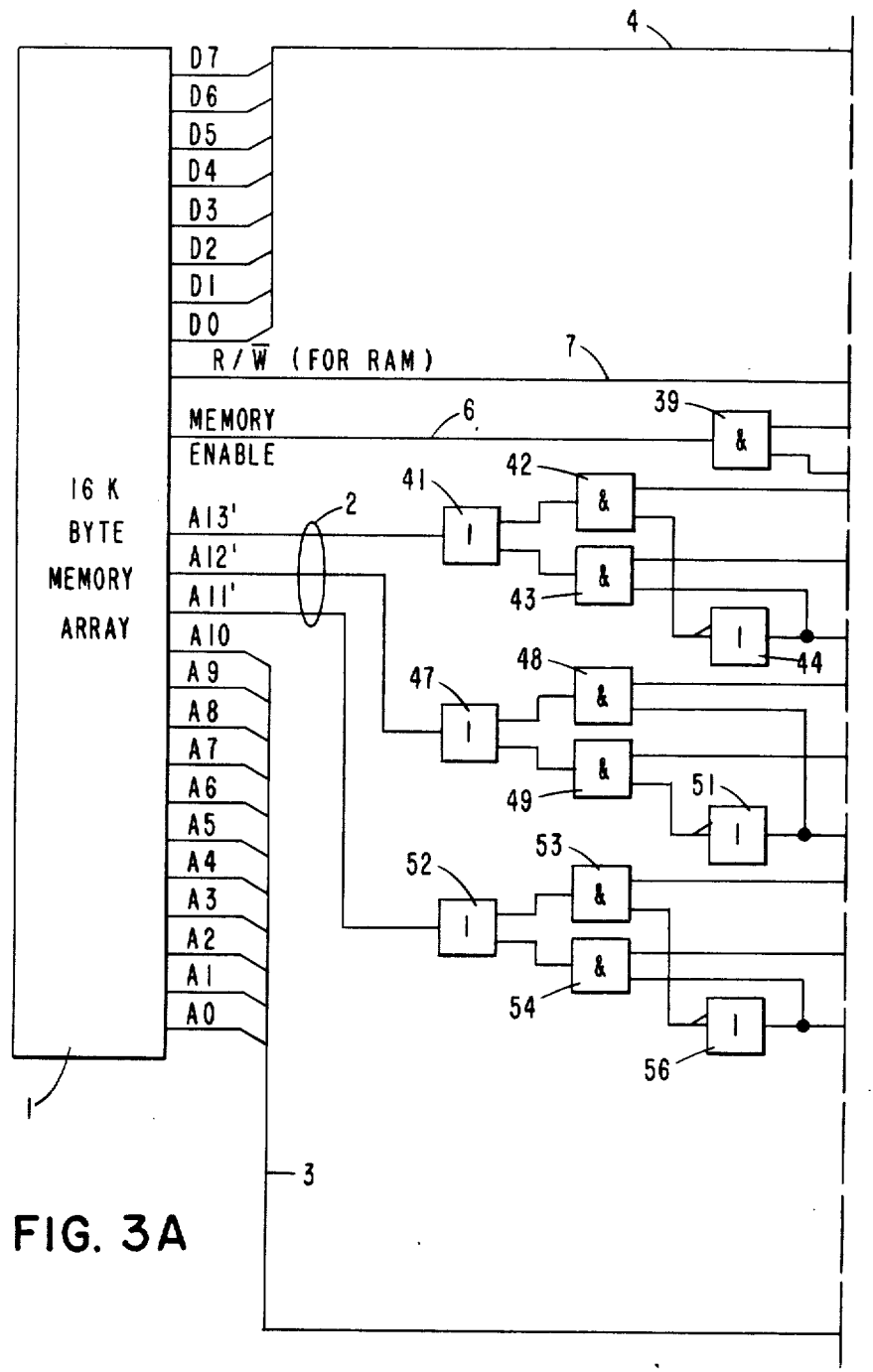
FIGS. 3A and 3B together form a circuit schematic embodying one variation of the features in the present invention.
Figure 3B:
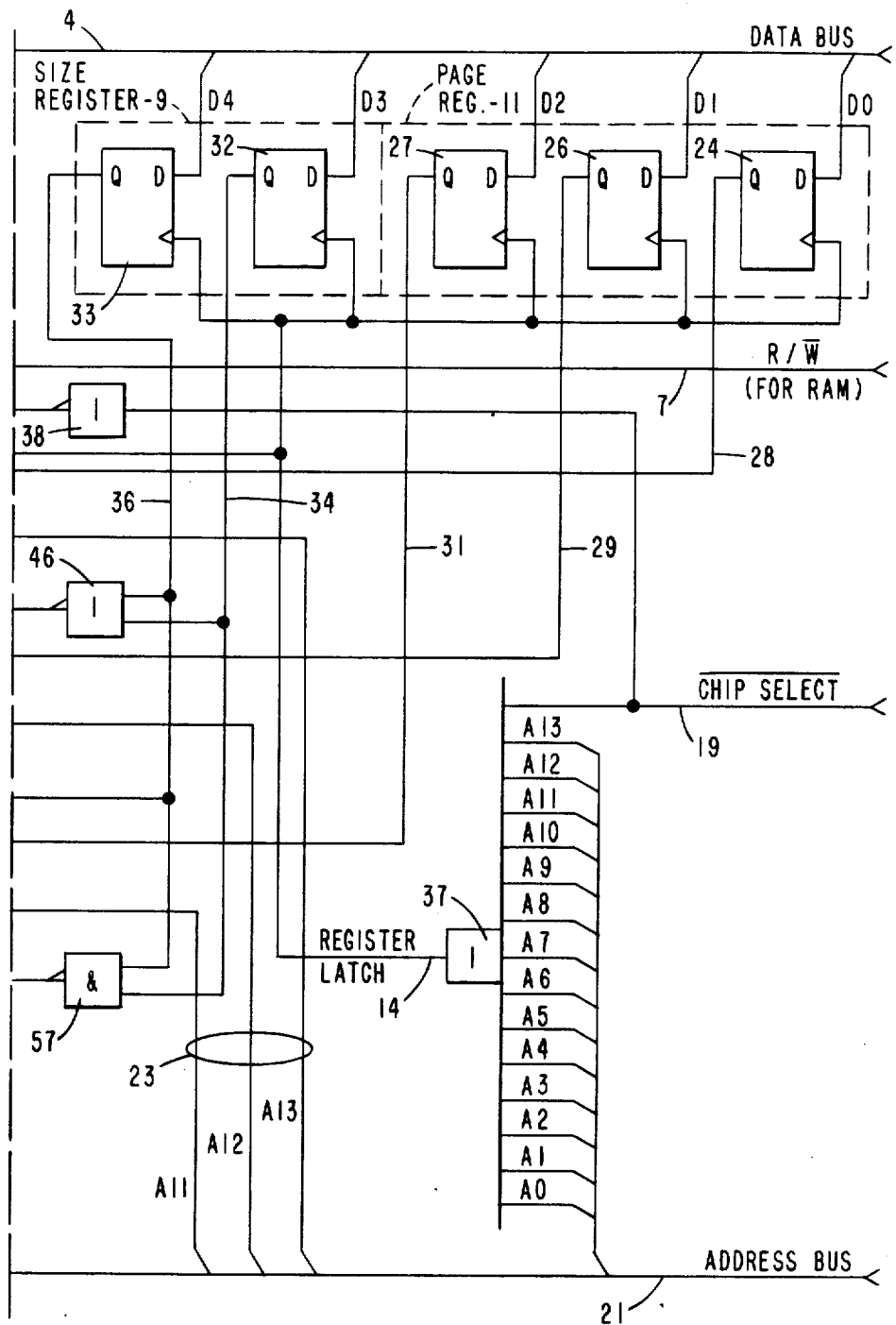

To illustrate the various features and implications of the functional configuration depicted in FIG. 1, attention is now directed to FIGS. 2, 3A and 3B for a detailed development of the embodiment. The illustration in FIG. 2 provides a conceptual presentation of the memory mapping performed by the present address and control system. FIGS. 3A and 3B illustrate a corresponding circuit implementation. For ease of comparison, the reference numerals attributed to functional elements in FIG. 1 will be employed to designate corresponding operative circuit elements in FIGS. 3A and 3B.

The memory mapping depicted in FIG. 2 is based on an embodiment in which the microcomputer system has 4K of unallocated address, yet wishes to address groups of information from a mass memory of 16K bytes. For instance, this would correspond to a microcomputer having an overall address capacity of 8K in which 4K is fully allocated to RAM address and internal control functions. Nevertheless, the microcomputer user wishes, by way of this example, to have the flexibility of selectively operating the microcomputer using programs such as PASCAL, BASIC or VISICALC (a registered trademark of Visicorp), various games, and an addressable data base, while remaining within the confines of the microcomputer hardware.

Referring to this embodiment of the present invention, six selected memory maps are employed to map the ROM address locations into the 4K of available address in the microcomputer. Referring to FIG. 2, ROM 1 is partitioned into eight 2K segments, numbered 0-7, of which the first 4K correspond to the PASCAL program, the second 4K correspond to the BASIC program, the succeeding 3K correspond to the VISI-CALC program, the next 1K correspond to GAME I, the next 2K correspond to GAME II, the following 1K correspond to a DATA BASE, and the final 1K are unprogrammed. Note the lack of direct correspondence between segments and programs, in that the programs can be larger or smaller than the segments. Consequently, if memory mapping is to be accomplished by page, the size of a page can be equal to or greater than the individual 2K segments of ROM 1.

First consider map number 1, representing the mapping of the 4K size PASCAL program as a single page. In that situation, the whole ROM is partitioned into four pages of 4K size each, so that segments 0 and 1 are mapped simultaneously as a single page. The same relationship exists for the BASIC program in map number 2, except that a different set of segments, 2 and 3, constitute the mapped elements for the page. The page size remains at 4K for the VISICALC program of map number 3, where the ROM segments 4 and 5 are address mapped. However, note that GAME I is mapped together with the VISICALC program, allowing access thereto through map number 3 given that the correct addresses are utilized during microcomputer operation.

Maps 4, 5 and 6 utilize 2K size pages, requiring that ROM 1 be partitioned into eight segments. Address map number 4 conveys GAME I and part of the VISICALC program, so that GAME I is distinguished by means of the address itself. In the case of map number 5, the whole of GAME II is mapped, with remaining microprocessor address being uncommitted. For map number 6, the 1K DATA BASE is mapped in the same manner.

In considering each of the address maps in relationship to the partitioning of the 16K ROM, it is no doubt now appreciated that the segments, illustrated as 0-7, are based on a division of the ROM into $2^n$ pieces, where n is an integer. Furthermore, the distribution of the program data must be such that the page size is compatible with the program, so that the partition does not split a mapped program, and so that the allocated address is compatible with the page size and address code. For the limited example in FIG. 2, one might now recognize that map number 4 is substantially redundant because GAME I is already addressable through map number 3. However, with map number 4, there remains 2K unused address which the microcomputer can utilize in other manners if provision is added to selectively decouple the unused addresses from the ROM. With an understanding of the concepts depicted in FIG. 2 at hand, attention will now focus on FIGS. 3A and 3B, in the composite, for a detailed circuit implementation of the illustrated mapping scheme.

The 16K byte memory array, 1, is shown in FIG. 3A to have a number of electrical connections: 14 address input lines, A0–A10 and A11'–A13'; eight data output lines, D0–D7; memory enable line 6; and read/write line 7 for the RAM configuration. Note the correspondence of reference numerals as to the address and data buses, with respect to FIG. 1.

Page register 11 in FIG. 3B is shown to be comprised of three D-type flip-flops, 24, 26 and 27. The D-inputs to the flip-flops are connected to data bus 4 lines D0–D2. The Q outputs from the flip-flops appear on lines 28, 29 and 31. Size register 9, immediately adjacent to page register 11, is shown to consist of two flip-flops, 32 and 33, and is connected to data bus 4 via lines D3 and D4, respectively. The size register Q output signals appear on lines 34 and 36. For the addressing and control system configuration depicted in FIGS. 3A and 3B, all D-type flip-flops are rising edge triggered.

According to the embodiment, all register flip-flops are latched by a common signal on register latch line 14, a signal generated in decode OR gate 37. The sequence of signals preceding the latching of data from bus lines D0–D4 into registers 9 and 11 begins with an address bus code, on lines A0–A13, of low level signals coinciding with a low level signal on chip select line 19. This combination generates a low level signal on register latch line 14, which upon further combination through inverter block 38 and AND gate 39 also generates a low level signal on memory enable line 6 to disable memory array 1. Memory array 1 is disabled to make data bus 4 available for the size and page register information provided on lines D0–D4 thereof. Latching of the data from lines D0–D4 occurs with the rise of the chip select signal on line 19 to the high level, in that the register latch signal on line 14 follows. Note that memory array 1 remains disabled by virtue of AND gate 39. At a point thereafter, the chip select signal returns to the low level, memory array 1 is enabled by line 6, and the bit codes stored in flip-flops 24, 26, 27, 32 and 33 of registers 9 and 11 are provided on respective Q output lines 28, 29, 31, 34 and 36.

The bit code from size register 9 on lines 34 and 36 defines, and effectively multiplexes, the code on bus lines A11, A12, and A13 with page register lines 28, 29 and 31, depending on the page size prescribed, to generate a mapped address for memory address input lines A11′, A12′ and A13′. The logic blocks by which this is implemented are depicted in FIGS. 3A and 3B, where gates 41, 42, 43, 44 and 46 combine to generate the memory address signal on line A13′; gates 47, 48, 49 and 51 combine to generate the memory address signal on line A12′; and gates 52, 53, 54, 56 and 57 combine to generate the memory address signal on line A11′. The various bit codes which define the memory array addresses according to the circuit in FIGS. 3A and 3B are prescribed according to Tables A, B, and C, which follow. The formation of the bit code data (D0–D4) which selects the program content and size of the mapping is performed in conventional manner, in the sense of generating an extended address.

TABLE A

| PAGE SIZE | PAGE SIZE CODE | |
|---|---|---|
| | D4 | D3 |
| 16K | 0 | 0 |
| 8K | 0 | 1 |
| 4K | 1 | 0 |
| 2K | 1 | 1 |

TABLE B

| SEGMENT NUMBER | PAGE SELECT CODE | | |
|---|---|---|---|
| | D2 | D1 | D0 |
| 0 | 0 | 0 | 0 |
| 1 | 1 | 0 | 0 |
| 2 | 0 | 1 | 0 |
| 3 | 1 | 1 | 0 |
| 4 | 0 | 0 | 1 |
| 5 | 1 | 0 | 1 |
| 6 | 0 | 1 | 1 |
| 7 | 1 | 1 | 1 |

TABLE C

| MAP NUMBER | ADDRESS MAPPING | | | | PAGE SIZE |
|---|---|---|---|---|---|
| | ADDRESS CODE AT MEMORY ARRAY INPUTS | | | | |
| | A0–A10 | A11′ | A12′ | A13′ | |
| 1 | Address bus | A11 | 0 | 0 | 4K |
| 2 | Address bus | A11 | 1 | 0 | 4K |
| 3 | Address bus | A11 | 0 | 1 | 4K |
| 4 | Address bus | 1 | 0 | 1 | 2K |
| 5 | Address bus | 0 | 1 | 1 | 2K |
| 6 | Address bus | 1 | 1 | 1 | 2K |

Table C shows that the signal on line A11 of address bus 21 is coupled to input line A11′ of memory array 1 when the page size is established at 4K. Though not explicitly shown in the tables, the circuit in FIGS. 3A and 3B also couples lines A12 to input line A12′ for an 8K size page, and further couples line A13 to line A13′ for a 16K page. It can now be appreciated that the present invention provides sufficient flexibility for the user to partition the memory array into selectively addressable pages which can range from small segments to the full expanse of the complete memory array.

TABLE D

| | | | MAPPING SUMMARY | | | | | | |
|---|---|---|---|---|---|---|---|---|---|
| MAP NUMBER | PROGRAM SIZE | PAGE SIZE | PAGE SIZE CODE | | PAGE SELECT CODE | | | SEGMENTS MAPPED | PROGRAM MAPPED |
| | | | D4 | D3 | D2 | D1 | D0 | | |
| 1 | 4K | 4K | 1 | 0 | X | 0 | 0 | 0,1 | PASCAL |
| 2 | 4K | 4K | 1 | 0 | X | 1 | 0 | 2,3 | BASIC |
| 3 | 3K | 4K | 1 | 0 | X | 0 | 1 | 4,5 | VISICALC/GAME I |
| 4 | 1K | 2K | 1 | 1 | 1 | 0 | 1 | 5 | GAME I |
| 5 | 2K | 2K | 1 | 1 | 0 | 1 | 1 | 6 | GAME II |
| 6 | 1K | 2K | 1 | 1 | 1 | 1 | 1 | 7 | DATA BASE |

X - DON'T CARE

Table D summarizes the address mapping for the conceptual embodiment in FIG. 2. Note the DON'T CARE condition created for line D2 when a 4K size page is defined, in that the signal on line A11′ of memory array 1 corresponds to the signal on line A11 of address bus 21.

Figure 4:
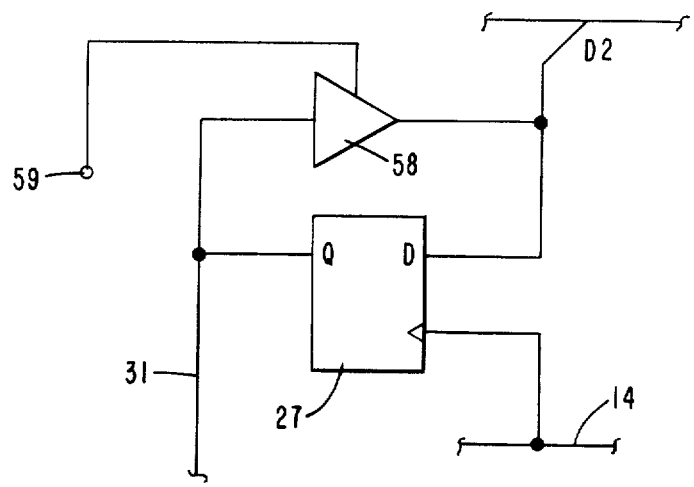
FIG. 4 is a circuit schematically illustrating a modification suitable to provide an interrogation feature to the memory control register.

It will no doubt be appreciated that the present invention is subject to diverse manifestations without departing from the fundamental teachings thereof. For example, latch flip-flop 26 from FIG. 3B is depicted in FIG. 4 with the addition of a tristate buffer, 58, between output Q on line 31 and input line D2. When buffer 58 is enabled by line 59, the content of flip-flop 27 is coupled onto data bus line D2 for detection at a distant location. With the addition of buffers such as 58 to each flip-flop, it becomes possible to interrogate memory control register 8 (FIG. 1) when the operating mode of the system does not provide means for retaining the page size and select code previously generated.

Another variant of the invention depicted in FIG. 1 contemplates an address bus having fewer lines than is necessary to fully address memory array 1. For instance, if address bus 21 were only N−M lines in size. In this case, the remaining bits, M in count, would be transmitted over the multiplex operated data bus, latched into memory control register 8 (FIG. 1), and provided on upper address bus 2 by the appropriate modification of the logic in memory control multiplex block 22.

In a similar fashion, it is foreseeable that the bit length of the page size or select register, or both, could be comparable to the line count of data bus 4 in FIG. 1. In the latter situation, buses 12 and 13 would be continuations of data bus 4, and each register would be latched by a separate register latch line. The generation of individual register latch line signals would require functionally separate decode blocks, each being responsive to a distinct bit code on address bus 21.

The RAM implementation of the circuit embodied in FIGS. 3A and 3B would be substantially identical, except for the addition of read/$\overline{\text{write}}$ line 7 and appropriate timing signals thereon. If the memory control register interrogation feature is to be added to a RAM configuration of the memory array, the decode logic would also have to interface with read/$\overline{\text{write}}$ line 7 to synchronize the disabling of the memory array with the write operation.

From the foregoing embodiments and variations thereof, it should be understood that the claims encompass not only the subject matter shown by specific examples but by the full spirit of the teachings provided herein.

We claim:

1. An addressing control system for a memory array having a plurality of input address lines and a plurality of data lines, comprising:

a first set and a second set of said memory array input address lines;

a subset of address lines from the set comprising an address bus, connected directed to said first set of said memory array input address lines;

means for decoding the signals on the set of address lines comprising the address bus and gengerating a timing signal to signify the presence of page and size register data signals on the data lines;

a page register and a size register connected to the data lines and means for sensing and storing page and size register data signals on the data lines in response to the timing signal from said means for decoding;

means for generating address signals on a second set of address lines connected to the second set of said memory array input address lines, said means for generating providing the address signals in response to the page and size register data signals stored in the page and size registers or to address signals on another subset of address lines of the address bus; and means responsive to the timing signal from the means for decoding for disabling the addressing operation of said memory array during the sensing of page and size register data signals on said data lines.

2. The system recited in claim 1, wherein said means for generating address signals on a second set of address lines is connected to receive signals from both said another subset of address lines of the address bus and said page register, for multiplexing such received signals in response to a code represented by signals received from said size register.

3. The system recited in claim 2, wherein the number of lines coupled from said page register to said means for generating address signals is numerically equal to the number of lines connecting said another subset of address lines from the set comprising the address bus to said means for generating address signals and to the number of lines in said second set of address lines.

4. The system recited in claim 3, wherein said means for decoding is a gate responsive to the signals on said set of address lines comprising the address bus in combination with a memory array selecting signal.

5. The system recited in claim 2, wherein said means for decoding is a gate responsive to the signals on said set of address signals comprising the address bus in combination with a memory array selecting signal.

* * * * *